(12) United States Patent
Akedo et al.

(10) Patent No.: US 11,225,436 B2
(45) Date of Patent: Jan. 18, 2022

(54) MULTILAYER STRUCTURE AND METHOD FOR PRODUCING SAME

(71) Applicant: NATIONAL INSTITUTE OF ADVANCED INDUSTRIAL SCIENCE AND TECHNOLOGY, Tokyo (JP)

(72) Inventors: Jun Akedo, Ibaraki (JP); Hiroaki Noda, Ibaraki (JP); Hiroki Tsuda, Ibaraki (JP); Nobuo Sakamoto, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 553 days.

(21) Appl. No.: 16/301,582

(22) PCT Filed: May 16, 2017

(86) PCT No.: PCT/JP2017/018395
§ 371 (c)(1),
(2) Date: Nov. 14, 2018

(87) PCT Pub. No.: WO2017/199968
PCT Pub. Date: Nov. 23, 2017

(65) Prior Publication Data
US 2019/0210914 A1    Jul. 11, 2019

(30) Foreign Application Priority Data

May 16, 2016 (JP) .............................. JP2016-098021

(51) Int. Cl.
*C03C 17/42* (2006.01)
*B05D 1/12* (2006.01)
(Continued)

(52) U.S. Cl.
CPC ................. *C03C 17/42* (2013.01); *B05D 1/12* (2013.01); *B32B 9/00* (2013.01); *B32B 27/18* (2013.01);
(Continued)

(58) Field of Classification Search
CPC ............... C03C 17/42; C03C 2217/29; C03C 2218/17; B32B 9/00; B32B 27/18; B05D 1/12; C23C 24/04; C08J 7/04
See application file for complete search history.

(56) References Cited

U.S. PATENT DOCUMENTS 6,228,796 B1 * 5/2001 Arakawa ................ B01D 53/86
428/325
2002/0071905 A1 6/2002 Akedo
(Continued)

FOREIGN PATENT DOCUMENTS

| CN | 104669733 | 6/2015 |
|---|---|---|
| JP | 2001-3180 | 1/2001 |

(Continued)

OTHER PUBLICATIONS

Hanft et al., "An Overview of the Aerosol Deposition Method: Process Fundamentals and New Trends in Materials Applications," Journal of Ceramic Science and Technology, Sep. 2015, vol. 6, No. 3, pp. 147-181. (Year: 2015).*

(Continued)

*Primary Examiner* — Alexander M Weddle
(74) *Attorney, Agent, or Firm* — Wenderoth, Lind & Ponack, L.L.P.

(57) ABSTRACT

A layered structure having high adhesive properties, and high hardness or excellent transparency, is prepared on a base material such as a resin. A layered structure including: an organic-inorganic hybrid member containing a primary inorganic particle and an organic polymer covalently bound
(Continued)

to each other, wherein the primary inorganic particle forms a network containing the polymer; and a particle aggregate layer containing a secondary particle which is deposited on the organic-inorganic hybrid member and is composed of an inorganic material or a metallic material; wherein in the organic-inorganic hybrid member, the primary inorganic particle and the secondary particle have different crystal particle sizes.

16 Claims, 8 Drawing Sheets

(51) Int. Cl.
 B32B 9/00 (2006.01)
 B32B 27/18 (2006.01)
(52) U.S. Cl.
 CPC ...... *C03C 2217/29* (2013.01); *C03C 2218/17* (2013.01)

(56) References Cited

U.S. PATENT DOCUMENTS

| | | | |
|---|---|---|---|
| 2007/0190309 | A1 | 8/2007 | Akedo et al. |
| 2010/0178481 | A1* | 7/2010 | George ............... C23C 28/00 428/213 |
| 2015/0147565 | A1 | 5/2015 | Popovici et al. |
| 2015/0228870 | A1 | 8/2015 | Goeoetz et al. |

FOREIGN PATENT DOCUMENTS

| | | |
|---|---|---|
| JP | 2003-034003 | 2/2003 |
| JP | 2005-161703 | 6/2005 |
| JP | 2006-175375 | 7/2006 |
| JP | 2007-077447 | 3/2007 |
| JP | 2008-1941 | 1/2008 |
| JP | 2010-036470 | 2/2010 |
| JP | 2013-159816 | 8/2013 |
| JP | 2014-049245 | 3/2014 |
| JP | 2015-101042 | 6/2015 |
| JP | 2017-028028 | 2/2017 |
| WO | 2004/035496 | 4/2004 |

OTHER PUBLICATIONS

Extended European Search Report dated Jan. 2, 2020 in European Patent Application No. 17799392.0.

Hanft et al., "An Overview of the Aerosol Deposition Method: Process Fundamentals and New Trends in Materials Applications," Journal or Ceramic Science and Technology, Sep. 2015, vol. 6, No. 3, pp. 147-181.

International Search Report dated Jul. 25, 2017 in International Application No. PCT/JP2017/018395.

International Preliminary Report on Patentability dated Nov. 29, 2018 in International Application No. PCT/JP2017/018395.

* cited by examiner

Sample 1

FIG. 2A

Sample 2

Schematic diagram: collision behavior of an inorganic microparticle in a case where the inorganic microparticles in the film are large particles

MULTILAYER STRUCTURE AND METHOD FOR PRODUCING SAME

TECHNICAL FIELD

The present invention relates to a layered structure in which a particle deposition layer is provided on an organic-inorganic hybrid member, and a method for preparing the layered structure.

BACKGROUND ART

As methods for depositing ceramic or metallic microparticles on a base material, the sol-gel method; vapor deposition methods such as the CVD method; application by screen printing; calcination-based methods; thermal spraying; and the like are known.

Most of the prior art techniques require heating during the film formation. As a result, melting, gasification, burning, or the like of the resin base material occurs, so that these techniques are not suitable for formation of a brittle material structure on a resin substrate.

In recent years, the aerosol deposition method is known as a novel film formation method. Application of a mechanical impact force to a brittle material causes a slip or fracture of the crystal lattice. On the resulting slip plane or fracture plane, a new active plane having an unstable surface state appears, and the active plane joins with an adjacent surface of the brittle material or its active plane, or with a base material surface. By repetition of this phenomenon, the joining advances to cause densification and thickening of the film.

Since the formation by the aerosol deposition method does not require heating that causes changes in the resin, the method is suitable for the purpose of forming a structure of a brittle material or the like on a resin substrate.

In a known mechanism of the aerosol deposition method that allows the formation of a brittle material or the like on a resin substrate, anchors are formed by sticking, to the base material, of sprayed microparticles, or of fine fragment particles generated by fracture caused by collision. Although the method can be said to be an effective joining method for inorganic base materials and the like, the method does not easily allow highly adhesive formation of an inorganic material such as a brittle material on a resin since formation of joints upon collision of brittle material microparticles to the resin base material is prevented by, for example, (1) repelling due to high elasticity of the resin base material; and (2) scraping of the resin base material by the impact of the collision. There is also a problem that a dense film cannot be formed.

Thus, for improving adhesion between resins and inorganic materials during the formation by the aerosol deposition method, several methods have been attempted.

For example, a method in which an underlayer composed of a hard material that partially cuts into the surface of a resin base material is formed has been reported (see Patent Documents 1 to 3). These are effective as means for reducing deterioration of the joining and deterioration of the density due to the elasticity of the resin and due to the scraping of the resin that is easily caused by the collision. However, in cases where a method such as vapor deposition or the sol-gel method is used, problems such as excessive heating of the resin are expected to occur as described above.

CITATION LIST

Patent Literature

[PTL 1]
JP 2003-034003 A
[PTL 2]
JP 2005-161703 A
[PTL 3]
JP 2013-159816 A

SUMMARY OF INVENTION

Technical Problem

Figure 4:
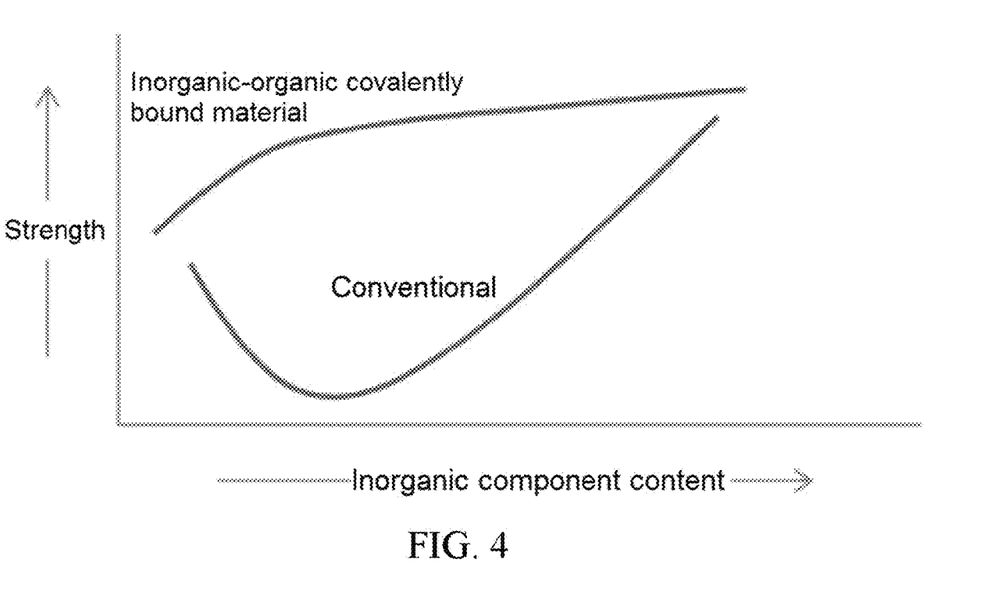
FIG. 4 shows a diagram illustrating occurrence of (1) an increase in the anchor effect due to dispersion of an inorganic substance; and (2) deterioration of the strength of a base material due to deterioration of bonding of a resin matrix caused by the dispersion of the inorganic substance; which lead to insufficiency of the adhesive strength as a whole.

In another method that has been devised, an inorganic surface is formed on a resin surface by dispersion of an inorganic material in a resin base material in order to enable, as a result, good joining with colliding microparticles. However, in cases where an inorganic substance is uniformly dispersed in an organic matrix as described above, the organic substance and the inorganic substance join together only by the van der Waals force, so that impacts such as collision of microparticles may cause phenomena such as cracking due to loss of the inorganic-organic bond, resulting in a strength lower than that of the organic base material in which the inorganic substance is not included. Thus, a problem occurs due to the fact that (1) an increase in the anchor effect due to the dispersion of the inorganic substance; and (2) deterioration of the strength of the base material due to deterioration of bonding of the resin matrix caused by the dispersion of the inorganic substance; occur competitively, leading to insufficiency of the adhesive strength as a whole. (See FIG. 4) Further, in spite of the fact that high transparency is required depending on the use, dispersion of an inorganic material in a resin base material causes a decrease in the transparency due to its decreased scattering and the like.

An object of the invention according to one mode of the present invention is preparation of a layered structure on a base material such as a resin, which layered structure has high hardness or high transparency, and excellent adhesive properties.

Solution to Problem

The present invention is as follows.
<1> A layered structure comprising:
an organic-inorganic hybrid member containing a primary inorganic particle and an organic polymer covalently bound to each other, wherein the primary inorganic particle forms a network containing the polymer; and
a particle aggregate layer containing a secondary particle which is deposited on the organic-inorganic hybrid member and is composed of an inorganic material or a metallic material;
wherein in the organic-inorganic hybrid member, the primary inorganic particle and the secondary particle have different crystal particle sizes.
<2> A layered structure comprising:
an organic-inorganic hybrid member containing a primary inorganic particle and an organic polymer which are deposited on a base material and covalently bound to each other, wherein the primary inorganic particle forms a network containing the polymer; and a particle aggregate layer containing a secondary particle which is deposited on the organic-inorganic hybrid member and is composed of an inorganic material or a metallic material;

wherein in the organic-inorganic hybrid member, the secondary particle enters, is bound to, or, enters and is bound to a layer of the network formed by the primary inorganic particle and the organic polymer, and the primary inorganic particle and the secondary particle have different crystal particle sizes.

<3> The layered structure according to <1> or <2>, wherein in the organic-inorganic hybrid member, the primary inorganic particle has a crystal particle size of not more than 500 nm.

<4> The layered structure according to any one of <1> to <3>, wherein in the particle aggregate layer, the secondary particle has a crystal particle size of not more than 10 µm.

<5> The layered structure according to any one of <1> to <4>, wherein the organic-inorganic hybrid member does not have a glass transition temperature.

<6> The layered structure according to any one of <2> to <5>, wherein the base material is an organic polymer.

<7> The layered structure according to any one of <2> to <5>, wherein the base material is a glass.

<8> The layered structure according to any one of <1> to <7>, wherein the layered structure has a haze value of not more than 10% regarding an optical transmittance.

<9> The layered structure according to <6> or <8>, wherein the base material is an organic polymer film whose back side has adhesiveness.

<10> The layered structure according to any one of <1> to <9>, wherein the organic-inorganic hybrid member has a porous structure.

<11> The layered structure according to any one of <1> to <10>, wherein the particle aggregate layer has a density of not less than 95%.

<12> The layered structure according to any one of <1> to <10>, wherein the particle aggregate layer has a density of not more than 80%.

<13> The layered structure according to any one of <1> to <12>, wherein the particle aggregate layer has a Vickers hardness of not less than 100 Hv.

<14> The layered structure according to any one of <1> to <13>, wherein the particle aggregate layer has a critical film breaking load of not less than 25 mN according to a scratch test.

<15> The layered structure according to any one of <1> to <14>, wherein the organic-inorganic hybrid member has a Young's modulus of not less than 0.1 GPa.

<16> A method for preparing the layered structure according to any one of <1> to <15>, the method comprising a step of forming the particle aggregate layer by an aerosol deposition method.

Advantageous Effects of Invention

According to the present invention, a layered structure having high adhesive properties, and high hardness or excellent transparency, can be prepared on a base material such as a resin. By increasing its surface hardness, the scratch resistance and the durability can be increased.

Thus, in a case where the organic-inorganic composite layered structure of the present invention is applied to a surface of a structure such as an automotive member (body member, coating material, window member, or the like), a member that has originally been constituted by a metal or a glass can be replaced by a resin-based member whose surface is laminated with an inorganic hard layer such as a ceramic, thereby allowing improvement of the scratch resistance and the durability, as well as weight reduction of the member.

In another case, by forming a highly adhesive ceramic layer having a film thickness of not more than 5 µm on a resin film whose back side has adhesiveness, a transparent flexible ceramic film having flexibility and high surface hardness can be formed. By attaching this film as a protection film to a smartphone or an automobile body, the scratch resistance and the durability can be improved, and at the same time, weight saving of members is possible.

DESCRIPTION OF EMBODIMENT

A layered structure according to one embodiment of the present invention comprises:

an organic-inorganic hybrid member containing a primary inorganic particle and an organic polymer covalently bound to each other, wherein the primary inorganic particle forms a network containing the polymer; and a particle aggregate layer containing a secondary particle which is deposited on the organic-inorganic hybrid member and is composed of an inorganic material or a metallic material;

wherein in the organic-inorganic hybrid member, the primary inorganic particle and the secondary particle have different crystal particle sizes.

A layered structure according to another embodiment of the present invention comprises:

an organic-inorganic hybrid member containing a primary inorganic particle and an organic polymer which are deposited on a base material and covalently bound to each other, wherein the primary inorganic particle forms a network containing the polymer; and a particle aggregate layer containing a secondary particle which is deposited on the organic-inorganic hybrid member and is composed of an inorganic material or a metallic material;

wherein in the organic-inorganic hybrid member, the secondary particle enters, is bound to, or, enters and is bound to a layer of the network formed by the primary inorganic particle and the organic polymer, and the primary inorganic particle and the secondary particle have different crystal particle sizes.

One embodiment of the present invention is a method for preparing the layered structure, which method comprises a step of forming the particle aggregate layer by the aerosol deposition method.

An example of the method for forming the above layered structure is a method in which a stronger bond is formed between the organic substance and the inorganic substance. By giving a covalent bond between the organic substance and the inorganic substance, a bond much stronger than the bond based only on the van der Waals force can be formed. It was found that, as a result of dispersing an inorganic substance in an organic matrix while maintaining the covalent bond, (1) repelling of particles due to the elasticity of the resin can be suppressed; (2) the strength of the base material can be increased by the dispersion of the inorganic substance; and (3) the anchor effect can be enhanced by generation of an inorganic surface on the base material surface. The substance having the organic-inorganic covalent bond is referred to as an organic-inorganic hybrid member (organic-inorganic composite material).

Figure 5:
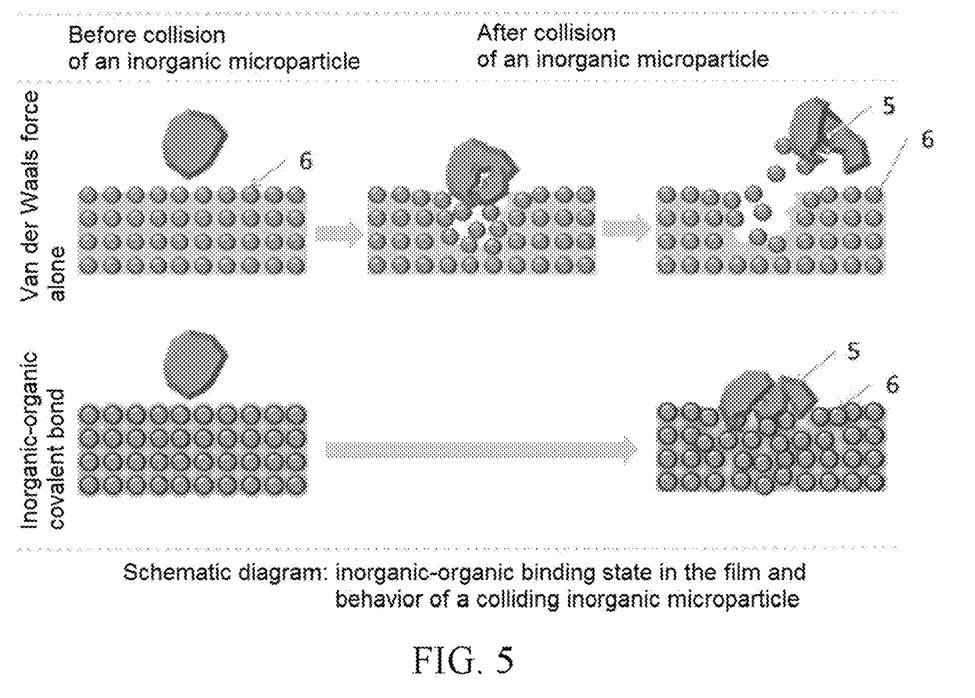
FIG. 5 shows a schematic diagram illustrating the binding state of an organic-inorganic substance in an organic-inorganic hybrid member, and behavior of a colliding inorganic particle.

Conventionally, in the above joining mechanism, bonding between inorganic substances has been drawing much attention. However, the present discovery showed that the strength in the base material film is an important factor for formation of an inorganic material such as a brittle material. (See FIG. 5)

Further, it is thought that plastic deformation of the colliding substance may be a condition required as a mechanism. Even in cases where the base material has high strength, occurrence of elastic deformation allows recovery of the shape of the substance, leading to failure in the adhesion. This explanation applies not only to the microparticle side, but also to the resin side. It is thought, for example, that properties of the resin itself may influence adhesion of the secondary particle such as a brittle material to the resin. For example, a resin which is thought to have a relatively high viscous term, such as an ABS resin, allows good adhesion, but a rubber-like substance does not allow good adhesion of a brittle material in the aerosol deposition method.

Regarding the mechanism of the above phenomenon, a parameter for the elastic term of the resin may influence the joining of the colliding secondary particle. An example of parameters that can explain the elastic term is the Young's modulus. As the value of the Young's modulus decreases, the properties of the resin become closer to rubber-like properties, and the resin can be said to have a higher repellency. Since a rubber-like substance has a low Young's modulus, which becomes close to 0, the substance repels colliding inorganic particles away because of its high repellency.

In contrast, ABS resins and styrol resins, which have excellent AD film formation properties, are said to have Young's moduli of not less than 0.1 GPa. As an alternative to the Young's modulus, the loss tangent may also be used for the judgment.

Thus, it is thought that there is an appropriate range (not less than 0.1 GPa) of the Young's modulus when a brittle material is used for film formation on a resin substrate using the aerosol deposition method. Further, it was found that, by combination with an inorganic material having a covalent bond, a film of a brittle material having adhesiveness and denseness that have never been achieved can be formed on a resin.

At least two methods can be employed for obtaining the above effect:

(1) a method in which a brittle material or metallic particle secondary particles are deposited on an organic-inorganic hybrid member by the aerosol deposition method to form a composite layered body; and (2) a method in which an organic-inorganic hybrid member is formed on a resin base material, and a brittle material or metallic particle secondary particles are deposited thereon by the aerosol deposition method to form a composite layered body.

The organic-inorganic hybrid member is prepared by, for example, using an alkoxy-containing silane-modified resin, and curing the resin.

Alternatively, an alkoxy-containing silane-modified resin may be applied to a coated surface formed by coating of a base material such as a common resin member, and a ceramic layer may be formed thereon by the aerosol deposition method, to thereby increase the surface hardness. Examples of the base material include, but are not limited to, inorganic materials such as metals and glasses as well as organic materials such as resins. From the viewpoint of transparency, a glass is preferably used as the base material. From the viewpoint of the weight, an organic polymer is preferably used as the base material. In another embodiment of the present invention, the base material is preferably an organic polymer film whose back side has adhesiveness.

Examples of the organic-inorganic hybrid member include the following:

(1) alkoxy-containing silane-modified polyamic acid resins, and resin compositions thereof;

(2) alkoxy-containing silane-modified polyurethane resins, and resin compositions thereof;

(3) alkoxy-containing silane-modified epoxy resins, and resin compositions thereof;

(4) alkoxy-containing silane-modified phenol resins, and resin compositions thereof; and organic-inorganic hybrid members prepared by curing of any of (1) to (4), wherein examples of the hybrid members include films and coatings.

The organic-inorganic hybrid member may be prepared by obtaining a commercially available product of an alkoxy-containing silane-modified resin and curing the resin, or may be obtained as a commercially available film-shaped product. Examples of the alkoxy-containing silane-modified resin include "Compoceran E102B" (manufactured by Arakawa Chemical Industries, Ltd.), and examples of the organic-inorganic hybrid member include "Pomiran" (manufactured by Arakawa Chemical Industries, Ltd.).

Regarding other examples, the following can be similarly regarded as the coatings, films, and the like: polyamideimide-silica hybrid members, silsesquioxane-hybrid members, and acrylic resin-silica hybrid members.

In the curing of the materials described above, the alkoxysilane moiety contained in the polymer is formed into nanosilica by a curing process such as the sol-gel process, resulting in formation of a structure in which the nanosilica (primary inorganic particle) is covalently bound in an organic polymer matrix.

In one embodiment of the present invention, the primary inorganic particle preferably has a crystal particle size of not more than 500 nm. The crystal particle size of the primary inorganic particle can be determined by observation with an electron microscope. The particle size distribution of the crystal particle size has a width.

Upon the deposition of the particle aggregate layer formed by spraying of raw material particles that are inorganic material or metallic material particles, the particles enter or are bound to the organic-inorganic hybrid member to provide the secondary particles.

A layered body prepared using secondary particles deposited on the base material (organic-inorganic hybrid member) or on the base material having an intermediate (inorganic-organic composite intermediate layer composed of an organic-inorganic hybrid member) given thereon provided by the method described above successfully achieved stronger adhesion, and higher densification of the film, compared to conventional methods.

Figure 6:
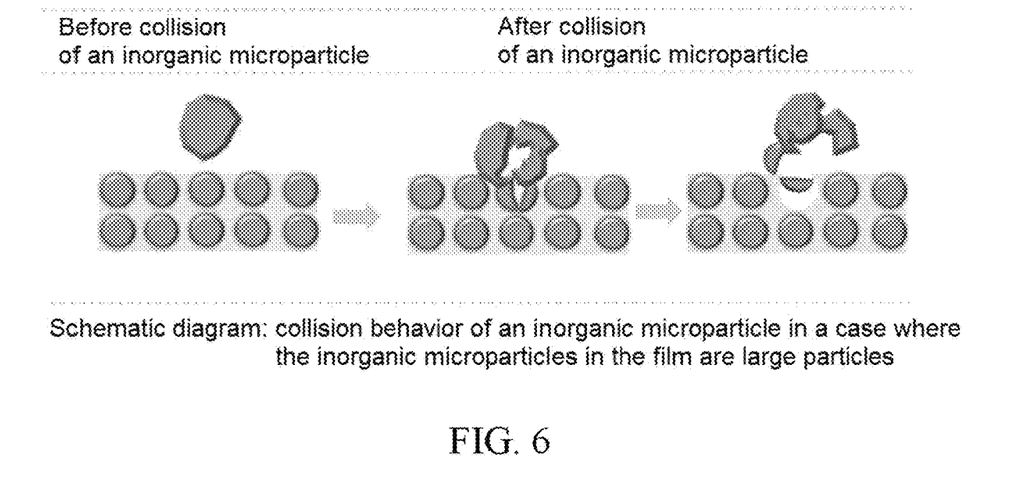
FIG. 6 shows a schematic diagram illustrating colliding behavior of an inorganic particle in a case where the inorganic particle in the organic-inorganic hybrid member is a large particle.

The particle size of the inorganic portion of the organic-inorganic hybrid material influences the joining with the inorganic layer of the upper layer. In cases where the particle is too large, the increase in the deterioration of the strength due to fracture of the inorganic portion has a larger influence than the increase in the joining plane. Thus, there is a desired particle size. The particle size is preferably not more than 500 nm. (See FIG. 6)

Figure 7:
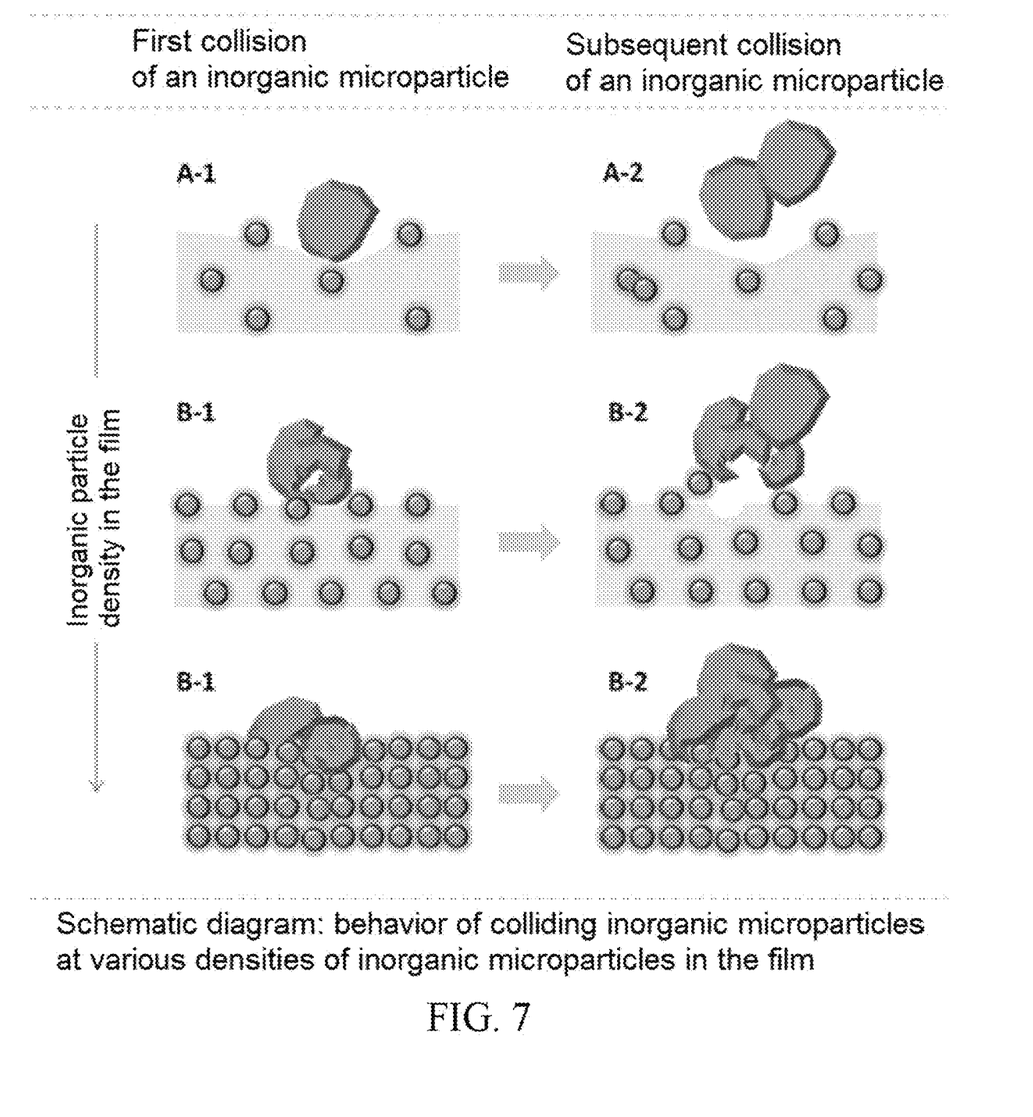
FIG. 7 shows a schematic diagram illustrating behavior of a colliding inorganic particle as observed at different densities of inorganic particles in the organic-inorganic hybrid member.

Further, it is thought that, as the inorganic particle concentration in the film increases, the possibility of collision with the colliding inorganic particles increases, that is, collision with the soft resin decreases, and destruction of the colliding particles due to collision with the hard inorganic particles becomes more likely to occur, resulting in easier formation of the film. (See FIG. 7)

Since the nanosilica has a covalent bond and shows dispersion in the organic-inorganic hybrid member, the organic-inorganic hybrid member, unlike other resin base materials, does not have an evident glass transition point.

In one embodiment of the present invention, for example, from the viewpoint of design, the organic-inorganic hybrid member preferably has a porous structure.

In one embodiment of the present invention, the organic-inorganic hybrid member preferably has a Young's modulus of not less than 0.1 GPa as measured by a standard tensile test.

Use of the above method enables preparation of a film which is not only adhesive to the base material, but also dense, resulting in an improved transmittance of the film. The film is characterized in that it has a haze value of especially not more than 10% regarding the optical transmittance. Because of the transparency with a haze value of not more than 10%, the film may be preferably used also for uses requiring a good appearance, or as an optical surface or a window.

The haze value (%) herein is the ratio of the diffuse transmittance in the total light transmittance (=diffuse transmittance+parallel light transmittance). The higher the turbidity of a transparent material, the higher the haze value. The haze value is represented by the following equation.

$$\text{Haze value (\%)} = \text{diffuse transmittance/total light transmittance} \times 100$$

By using the above method, denseness of the film can be increased. A density of not less than 95% can be achieved.

The aerosol deposition method allows formation of not only a dense film, but also a porous film. For example, a film having a density of not more than 80% can be formed. "The density of the particle aggregate layer is 80%" means formation of voids at 20% in the particle aggregate layer. Depending on the density of interest of the particle aggregate layer, physical properties of the raw material (for example, the particle size) and parameters for the film formation (for example, the flow rate) may be appropriately set.

Since the aerosol deposition method enables formation of a strong inorganic material layer, the layered structure can achieve a Vickers hardness of not less than 100 Hv, and a critical film breaking load of not less than 25 mN according to a scratch test.

In one embodiment of the present invention, from the viewpoint of the contact area with the colliding particle, the crystal particle size of the secondary particle in the particle aggregate layer is preferably not more than 10 The crystal particle size of the secondary particle in the particle aggregate layer can be determined by observation with an (electron) microscope.

In an embodiment of the present invention, the particle in the particle aggregate layer is not limited to a ceramic, and may be a metallic microparticle. Examples of the particle in the particle aggregate layer include metal oxide ceramics such as alumina, zirconia, barium titanate, lead zirconate titanate, titanium oxide, zinc oxide, yttria, and silica; non-oxide ceramics such as aluminum nitride, silicon nitride, and carbon nitride; metals such as Al, Mg, and Fe; and intermetallic compounds. Among these, from the viewpoint of the hardness and the density, and the versatility as a raw material, aluminum oxide, zirconia, and the like are preferred.

In one embodiment of the present invention, the particle aggregate layer preferably has a density of not less than 95%. The density of the particle aggregate layer can be determined using, for example, a method in which a cross-sectional photograph of the layer is taken using an electron microscope, and the ratio of holes is calculated from the cross-sectional photograph obtained.

In one embodiment of the present invention, the particle aggregate layer preferably has a density of not more than 80%.

In one embodiment of the present invention, the particle aggregate layer preferably has a Vickers hardness of not less than 100 Hv.

In one embodiment of the present invention, the particle aggregate layer preferably has a critical film breaking load of not less than 25 mN according to a scratch test.

The particle aggregate layer on the organic-inorganic hybrid member is preferably formed as follows. As a raw material of secondary particles, inorganic particles of about 0.5 to 3 μm are sprayed to an organic-inorganic hybrid member by the AD method. Collision of the particles with the surface of the organic-inorganic hybrid member causes fracture of the particles to a particle size of not more than 50 nm, and the surfaces of the fractured secondary inorganic particles are activated. This then causes recombination between the fractured inorganic particles and primary inorganic particles in the intermediate layer, and between the fractured inorganic particles themselves, resulting in formation of the particle aggregate layer.

As a pretreatment for the film formation, the inorganic particles to be used for the formation of the particle aggregate layer may be subjected to drying treatment at 100° C. to 300° C.

EXAMPLES

The layered structure and the method for producing it are concretely described below by way of Examples. However, the present invention is not limited to these Examples.

Example 1

Figure 1A:
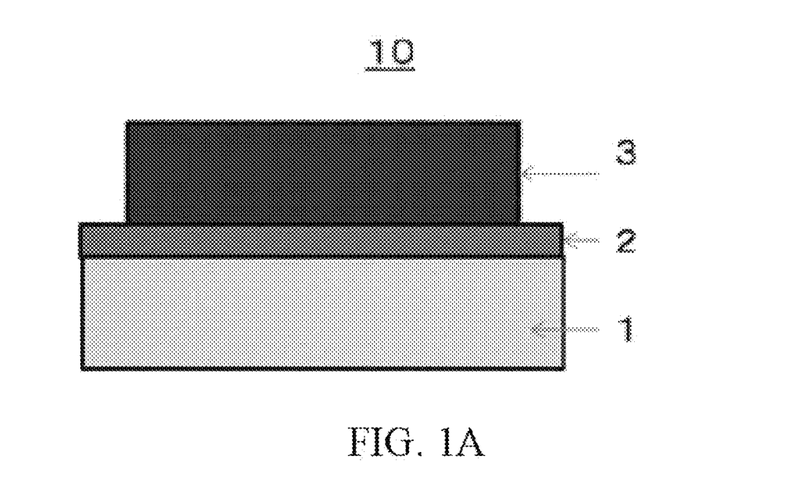
FIG. 1A shows a cross-sectional view illustrating an example of the layered structure according to the present invention.

FIG. 1A shows a cross-sectional view of a layered structure 10 in which an organic-inorganic hybrid member 2 is deposited on a resin base material 1, and a ceramic particle aggregate layer 3 is deposited on the organic-inorganic hybrid member 2.

Figure 1B:
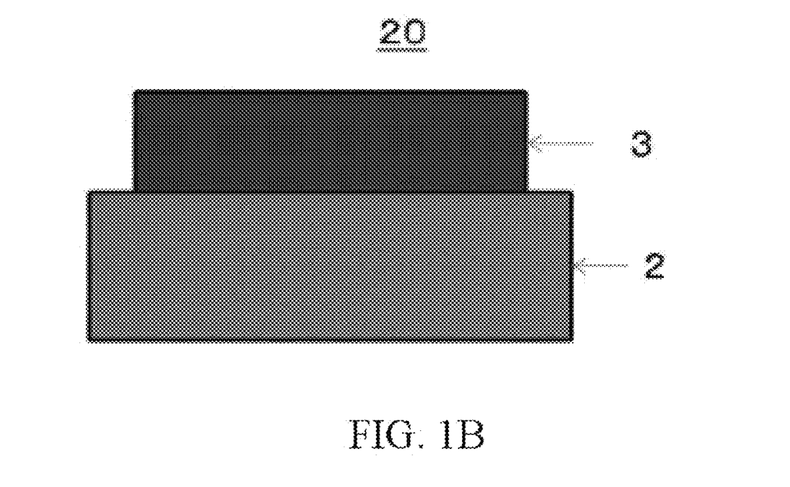
FIG. 1B shows a cross-sectional view illustrating another example of the layered structure according to the present invention.

FIG. 1B shows a cross-sectional view of a layered structure 20 in which the ceramic particle aggregate layer 3 is deposited on the organic-inorganic hybrid member 2.

Production Examples 1 to 3

As an aerosol deposition apparatus, for example, a known aerosol deposition (AD) apparatus having a common constitution, equipped with a film formation chamber, an aerosol chamber, a vacuum pump, and a carrier gas generator, described in a non-patent document (J. Am. Ceram. Soc., 89[6] pp. 1834 (2006)) was used. For the formation of the inorganic material layer (particle aggregate layer), an aluminum oxide powder (AL-160SG series, manufactured by Showa Denko K.K.) was used. As a pretreatment for the film formation, the powder was subjected to drying treatment at 120° C. to 250° C. Using the dried aluminum oxide powder, an inorganic material layer was formed by the aerosol deposition (AD) method at room temperature to prepare a sample (layered structure). In the film formation, dry air or nitrogen gas was introduced into the aerosol chamber at a flow rate of 3 L/min to 5 L/min to generate an aerosol in which the aluminum oxide microparticles are dispersed.

The following three kinds of base materials were used: a resin base material; a base material prepared by formation of an organic-inorganic hybrid member on a resin base material; and an organic-inorganic hybrid member base material. As the organic base material, polyethylene terephthalate (PET) (100 μm thickness) was used.

In the organic-inorganic hybrid member, nanosilica formed by curing of an alkoxy-containing silane-modified resin shows a particle size of about 5 nm as a primary particle.

The ceramic layer on the organic-inorganic hybrid member is formed as follows. Secondary inorganic particles having an average particle size of about 0.5 to 3 μm are sprayed by the AD method. Collision of the particles with the surface of the organic-inorganic hybrid member causes fracture of the particles to a particle size of not more than 50 nm, and the surfaces of the fractured secondary inorganic particles are activated. This then causes recombination between the fractured inorganic particles and the primary inorganic particles in the intermediate layer, and between the fractured inorganic particles themselves, resulting in formation of the ceramic layer.

The organic-inorganic hybrid member of Sample 2 was prepared as follows. To 48.7 g of an alkoxy-containing silane-modified epoxy resin "Compoceran E102B" (manufactured by Arakawa Chemical Industries, Ltd.), 4.6 g of an acid anhydride curing agent "Rikacid MH-700" (manufactured by New Japan Chemical Co., Ltd.), 0.6 g of a curing catalyst "Curezol 2E4MZ" (manufactured by Shikoku Chemicals Corporation), and 46.1 g of methyl ethyl ketone were added, and the resulting mixture was sufficiently stirred to prepare a coating material. This coating material was applied to a preliminarily obtained PET film using a wire bar, and then dried at 80° C. for 90 seconds, followed by curing at 120° C. for 30 minutes.

Since the organic-inorganic hybrid member of Sample 2 was prepared by curing of the alkoxy-containing silane-modified epoxy resin as described above, the organic polymer portion and the primary inorganic particle portion form covalent bonds to construct a network.

Regarding the organic-inorganic hybrid member of Sample 3, a base material prepared by curing of an alkoxy-containing silane-modified polyamic acid resin into a film shape (manufactured by Arakawa Chemical Industries, Ltd.; trade name, Pomiran) was used as an organic-inorganic hybrid member base material.

The film thickness was 38 μm. Since this base material was prepared by curing of the alkoxy-containing silane-modified polyamic acid resin, the organic polymer portion and the primary inorganic particle portion form covalent bonds to construct a network.

Figure 2A:
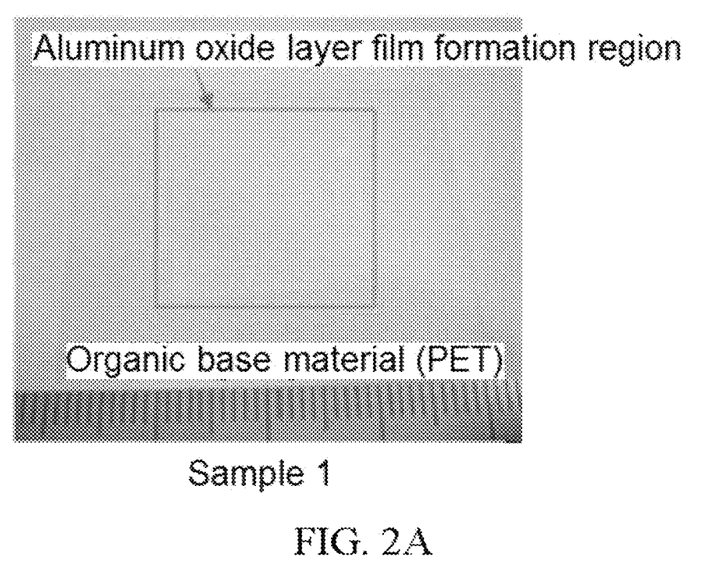
FIG. 2A shows examples of the external appearances observed when an inorganic material layer (particle aggregate layer) was formed on an organic base material.
Figure 2B:
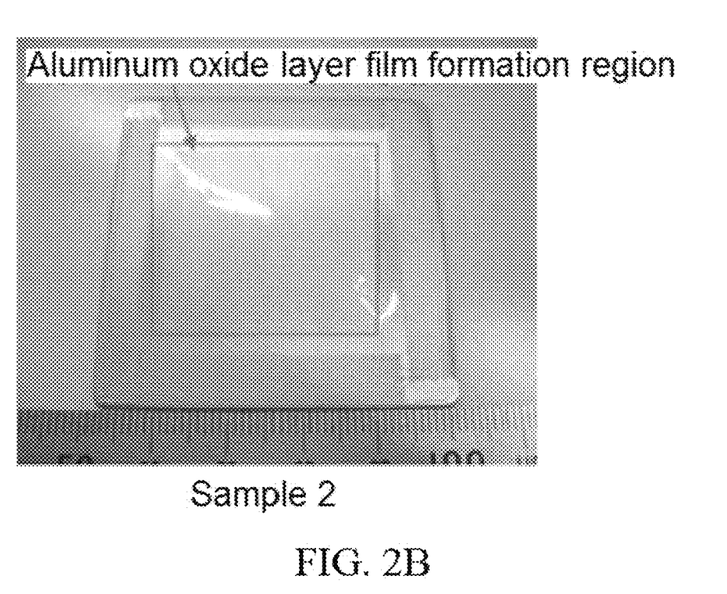
FIG. 2B shows examples of the external appearances observed when an organic-inorganic hybrid member was formed on an organic base material, and then an inorganic material layer (particle aggregate layer) was laminated thereon.
Figure 2C:
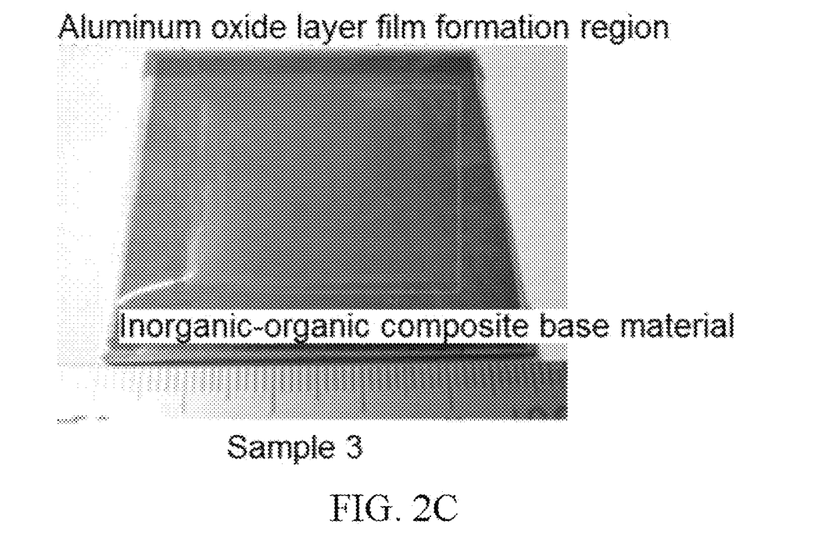
FIG. 2C shows examples of the external appearances observed when an inorganic material layer (particle aggregate layer) was formed on an organic-inorganic hybrid member base material. (Drawing-substituting photographs)

FIG. 2A shows examples of the external appearances of samples in which the inorganic material layer was formed on the organic base material (Sample 1). FIG. 2B shows examples of the external appearances of samples in which the organic-inorganic hybrid member was formed on the organic base material, and then the inorganic material layer was laminated thereon (Sample 2). FIG. 2C shows examples of the external appearances of samples in which the inorganic material layer was formed on the organic-inorganic hybrid member base material (Sample 3).

In cases where an aluminum oxide film as an inorganic material layer is to be formed on a PET base material, which is an organic material, the inorganic material layer can be typically formed when its film thickness is up to about 1 μm depending on the film formation conditions and the powder processing conditions. However, in cases where the film is thicker than this, phenomena such as detachment and cracking of the film occur, leading to difficulty in formation of a stable film. In contrast, in cases where aluminum oxide was formed on the base material prepared by formation of the organic-inorganic hybrid member intermediate layer on PET, or on the organic-inorganic hybrid member base material, stable formation of an aluminum oxide layer having a film thickness of not less than 2 µm was possible.

The prepared samples (Samples 1 to 3) were compared by a scratch test, which enables evaluation based on practical indices such as the film strength and the durability. The measurement was carried out using a Nano-layer Scratch Tester (CSR-2000, manufactured by Rhesca Co., Ltd.), which utilizes the micro-scratch method for the evaluation. As an indenter needle for application of a load to the coating surface, a diamond indenter having a radius of curvature of 5 µm was used, and the test was carried out using the indenter at a sweep rate of 5 µm/sec. The excitation amplitude and the excitation frequency were set to 100 µm and 45 Hz, respectively. Main conditions for the scratch test were as follows.

Test apparatus: Nano-layer Scratch Tester (CSR-2000, manufactured by Rhesca Co., Ltd.)
Indenter type: diamond indenter
Radius of curvature of the indenter: 5 µm
Scratch rate: 5 µm/sec.
Excitation amplitude: 100 µm
Excitation frequency: 45 Hz
Spring constant: 100 gf/mm
Test temperature: 24±4° C.
Test humidity: not more than 65%

A surface change of the film was detected with the indenter needle, and, based on the electric signal output from the sensor upon the detection, and based on observation under the microscope, damaging and destruction of the film structure were judged. The load at which the film structure destruction occurred was regarded as the critical film breaking load, and the arithmetic average calculated based on tests at three points was provided as the measured value for each sample. Table 1 shows the measurement results together with the constitutions of the samples and the conditions for the film formation. For the micro-scratch method, one may refer to Daisuke Arai, Journal of the Surface Finishing Society of Japan, Vol. 58, No. 5, 2007, p. 295.

inorganic hybrid member on the organic base material, or formed on the organic-inorganic composite base material (organic-inorganic hybrid base material), and the sensor output observed upon the detection of the film surface change. A large change in the sensor output was found for Sample 2 when the load exceeded about 50 mN, or for Sample 3 when the load exceeded about 35 mN, and an indentation indicating damaging and destruction of the film structure was found. Thus, improved critical film breaking loads were found as compared to Sample 1.

It was thus shown that, by the formation of the aluminum oxide film as an inorganic material layer on the organic-inorganic hybrid member base material or on the organic-inorganic hybrid member, the critical film breaking load increased, so that the film strength increased. This is thought to be due to the fact that the aluminum oxide film was more strongly bound to the base material, and that the aluminum oxide film stacked thereon was more densely formed, leading to the increase in the film strength.

Example 2

Using the Production Examples 1 to 3 as samples, the transmittance and the haze value of each layered structure were evaluated. The results are shown in Table 2. The measurement of the haze was carried out according to ASTM D1003-61.

TABLE 2

| Sample | % Transmittance | Haze value |
|---|---|---|
| 1 | 86% | 35% |
| 2 | 95% | 4.2% |
| 3 | 94% | 5.5% |

REFERENCE SIGNS LIST

1: Base material
2: Organic-inorganic hybrid member

TABLE 1

| Sample | Base material | Inorganic-organic composite intermediate layer | Inorganic material layer | Raw material powder pretreatment | Carrier gas flow rate [L/min] | Critical film breaking load [mN] |
|---|---|---|---|---|---|---|
| 1 | Organic material (PET) | Absent | Aluminum oxide | Drying at 120 to 250° C. | 3 to 5 | 22.9 |
| 2 | Organic material (PET) | Present | Aluminum oxide | Drying at 120 to 250° C. | 3 to 5 | 55.5 |
| 3 | Organic-inorganic composite material | Absent | Aluminum oxide | Drying at 120 to 250° C. | 3 to 5 | 35.7 |

The critical film breaking load herein is an evaluation index corresponding to the adhesive strength. The higher the critical film breaking load, the higher the adhesive strength.

Figure 3A:
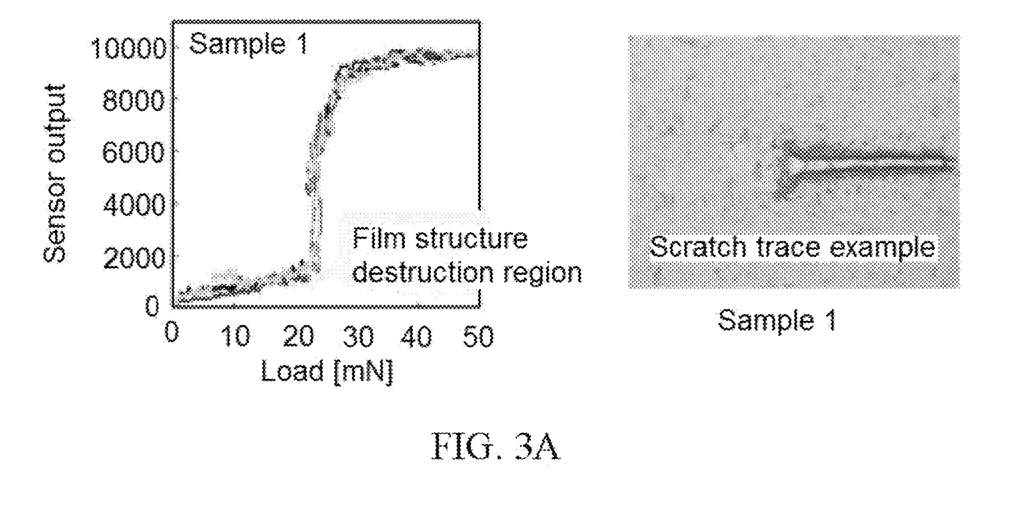
FIG. 3A shows an example of an indentation on a surface of an aluminum oxide film observed when a scratch test was carried out for a sample having an aluminum oxide layer formed on PET, and the sensor output observed upon the detection of the film surface change.
Figure 3B:
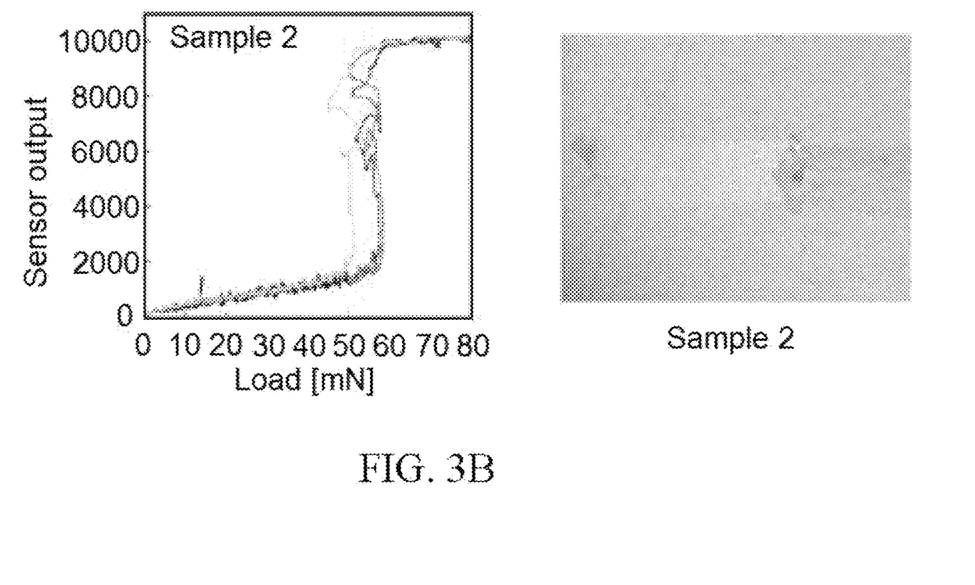
FIG. 3B shows an example of an indentation on a surface of an aluminum oxide film observed when a tensile test was carried out after forming an organic-inorganic hybrid member on an organic base material, and a diagram showing the sensor output observed upon the detection of the film surface change.
Figure 3C:
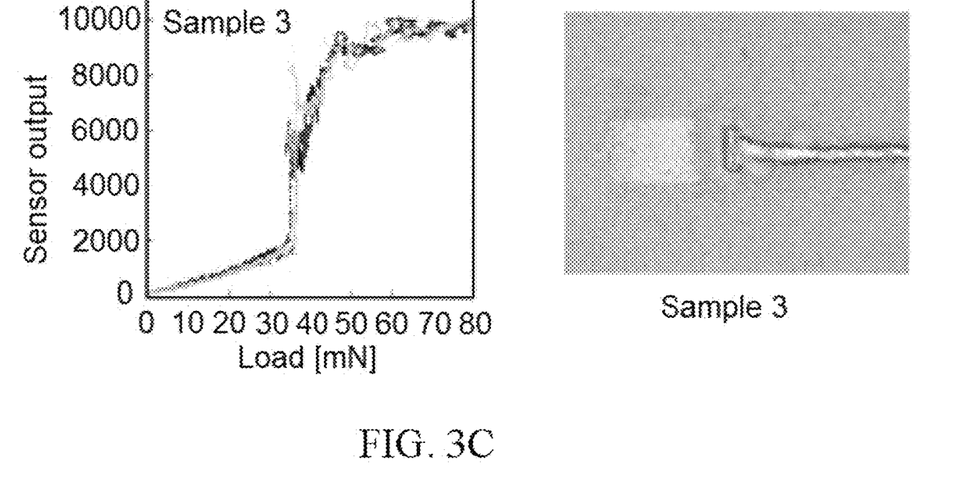
FIG. 3C shows an example of an indentation on a surface of an aluminum oxide film observed when a tensile test was carried out after forming the aluminum oxide film on an organic-inorganic composite base material (organic-inorganic hybrid member), and a diagram showing the sensor output observed upon the detection of the film surface change. (Drawing-substituting photographs)

FIG. 3A shows an example of the indentation on the surface of the aluminum oxide film observed when the scratch test was carried out for the sample having the aluminum oxide layer formed on PET (Sample 1), and the sensor output observed upon the detection of the film surface change. When the load exceeded about 20 mN, the sensor output largely changed, and a trace of damaging and destruction of the film structure remained.

FIGS. 3B and 3C show examples of the indentation on the surface of the aluminum oxide film observed when the tensile test was carried out for each of the samples (Samples 2 and 3) in which the aluminum oxide film was formed on the base material prepared by formation of the organic- 3: Particle aggregate layer
10, 20: Layered structure

The invention claimed is:

1. A layered structure comprising:
an organic-inorganic hybrid member containing a primary inorganic particle and an organic polymer covalently bound to each other, wherein the primary inorganic particle forms a network containing the polymer; and
a particle aggregate layer containing a secondary particle which is deposited on the organic-inorganic hybrid member and consists of an inorganic material or a metallic material;
wherein the primary inorganic particle and the secondary particle have different crystal particle sizes.
2. The layered structure according to claim 1, wherein in the organic-inorganic hybrid member, the primary inorganic particle has a crystal particle size of not more than 500 nm.

3. The layered structure according to claim 1, wherein in the particle aggregate layer, the secondary particle has a crystal particle size of not more than 10 μm.

4. The layered structure according to claim 1, wherein the organic-inorganic hybrid member does not have a glass transition temperature.

5. The layered structure according to claim 1, wherein the layered structure has a haze value of not more than 10% regarding an optical transmittance.

6. The layered structure according to claim 1, wherein the organic-inorganic hybrid member has a porous structure.

7. The layered structure according to claim 1, wherein the particle aggregate layer has a density of not less than 95%, wherein the density is a percentage of voids that are formed in the particle aggregate layer.

8. The layered structure according to claim 1, wherein the particle aggregate layer has a density of not more than 80%, wherein the density is a percentage of voids that are formed in the particle aggregate layer.

9. The layered structure according to claim 1, wherein the particle aggregate layer has a Vickers hardness of not less than 100 Hv.

10. The layered structure according to claim 1, wherein the particle aggregate layer has a critical film breaking load of not less than 25 mN according to a scratch test, the scratch test using a micro-scratch method whereby an indenter needle applies an electrical load to a surface of the layered structure, and, when a surface change is detected with the indenter needle based on an electric signal output from a sensor, destruction of the layered structure is observed under a microscope, the critical film breaking load being the electrical load at which the destruction occurred.

11. The layered structure according to claim 1, wherein the organic-inorganic hybrid member has a Young's modulus of not less than 0.1 GPa.

12. A method for preparing the layered structure according to claim 1, the method comprising a step of forming the particle aggregate layer by an aerosol deposition method.

13. A layered structure comprising:
   an organic-inorganic hybrid member containing a primary inorganic particle and an organic polymer which are deposited on a base material and covalently bound to each other, wherein the primary inorganic particle forms a network containing the polymer; and
   a particle aggregate layer containing a secondary particle which is deposited on the organic-inorganic hybrid member and consists of an inorganic material or a metallic material;
   wherein in the organic-inorganic hybrid member, the secondary particle enters, is bound to, or, enters and is bound to a layer of the network formed by the primary inorganic particle and the organic polymer, and the primary inorganic particle and the secondary particle have different crystal particle sizes.

14. The layered structure according to claim 13, wherein the base material is an organic polymer.

15. The layered structure according to claim 13, wherein the base material is a glass.

16. The layered structure according to claim 13, wherein the base material is an organic polymer film whose back side is capable of adhering to a smartphone or an automobile body.

* * * * *